United States Patent [19]

Fleming et al.

[11] Patent Number: 4,872,895
[45] Date of Patent: Oct. 10, 1989

[54] METHOD FOR FABRICATING ARTICLES WHICH INCLUDE HIGH SILICA GLASS BODIES

[75] Inventors: James W. Fleming, Westfield; David W. Johnson, Jr., Pluckemin; John B. MacChesney, Lebanon; Sandra A. Pardenek, Westfield, all of N.J.

[73] Assignee: American Telephone and Telegraph Company, AT&T Bell Laboratories, Murray Hill, N.J.

[21] Appl. No.: 940,392

[22] Filed: Dec. 11, 1986

[51] Int. Cl.$^4$ ............................................. C01B 33/18
[52] U.S. Cl. ..................... 65/18.1; 65/18.2; 65/18.4; 65/21.5; 423/338
[58] Field of Search ............ 65/18.1, 18.2, 18.3, 65/18.4, 21.5, 33, 900, 901, DIG. 16, 17; 423/338; 501/12

[56] References Cited

U.S. PATENT DOCUMENTS

| | | | |
|---|---|---|---|
| 3,306,843 | 2/1967 | Beuther | 423/338 |
| 3,347,798 | 10/1967 | Baer et al. | 423/338 |
| 3,417,028 | 12/1968 | Montgomery et al. | 423/338 |
| 3,501,269 | 3/1970 | Winyall et al. | 423/338 |
| 3,527,563 | 9/1970 | Shanklin | 423/338 |
| 3,959,174 | 5/1976 | Winyall et al. | 423/338 |
| 4,053,565 | 10/1977 | Krekler | 423/338 |
| 4,076,651 | 2/1978 | Jacques | 423/338 |
| 4,256,682 | 3/1981 | Denton | 423/338 |
| 4,419,115 | 12/1983 | Johnson, Jr. et al. | 65/18.1 |
| 4,441,905 | 4/1984 | Malmendier et al. | 501/12 |
| 4,528,010 | 7/1985 | Edahiro et al. | 65/3.15 |
| 4,640,807 | 2/1987 | Afghan et al. | 423/338 |
| 4,678,652 | 7/1987 | Tamenori et al. | 423/338 |
| 4,696,808 | 9/1987 | Barber et al. | 423/338 |
| 4,752,458 | 6/1988 | Robinson | 423/338 |

*Primary Examiner*—David L. Lacey
*Assistant Examiner*—L. Johnson
*Attorney, Agent, or Firm*—Bernard Tiegerman

[57] ABSTRACT

A method for forming articles which include silica-containing glass bodies, as well as the resulting articles, are disclosed. In accordance with the method, silica-containing gel particles are fused to form a glass body. In contrast to previous such methods, these particles are formed by mechanically, substantially uniformly subdividing either a substantially cohesive gel body, or an ungelled or partially gelled sol capable of yielding a substantially cohesive gel body, to form substantially uniformly sized, wet gel particles. Significantly, only substantially cohesive gel bodies which are also substantially elastic are useful in the invention, i.e., mechanical subdivision of non-elastic gel bodies results in these bodies undergoing plastic flow to yield non-particulate, pasty masses.

9 Claims, 1 Drawing Sheet

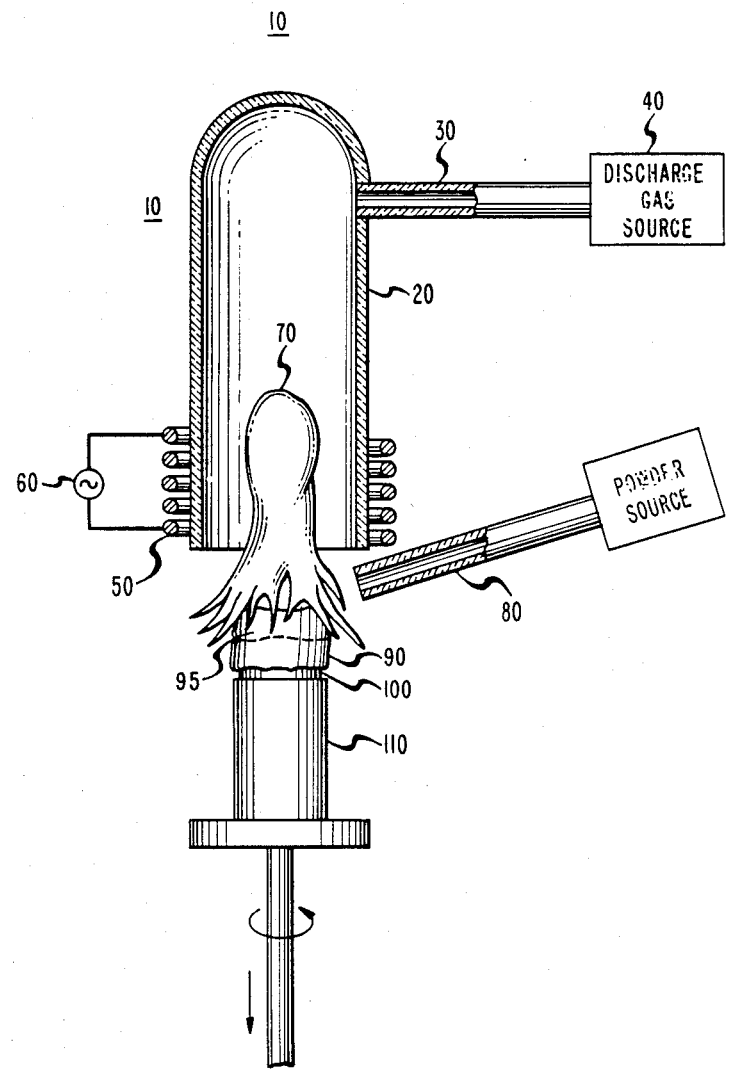

METHOD FOR FABRICATING ARTICLES WHICH INCLUDE HIGH SILICA GLASS BODIES

BACKGROUND OF THE INVENTION

1. Field of the Invention

The invention pertains generally to a method for fabricating articles which include high silica glass bodies, e.g., high silica glass optical fibers, as well as the articles produced by the method.

2. Art Background

Articles which include high silica glass bodies, i.e., glass bodies containing at least 70 percent by weight of silica, are currently employed in a wide variety of commercial settings. For example, optical fibers, drawn from high silica glass optical fiber preforms, are currently being used in optical communication systems. Such fibers typically include a high silica glass core encircled by a high silica glass cladding, with the former having a higher refractive index than the latter to achieve guiding of electromagnetic radiation. This difference in refractive index is achieved, for example, by incorporating an up dopant (a dopant which increases refractive index) into the core, or incorporating a down dopant (a dopant which decreases refractive index) into the cladding, or through the incorporation of both up and down dopants. Other articles which include high silica glass bodies, such as high silica glass lenses and prisms, are used in a wide variety of optical systems, while articles such as high silica glass refractory tubing, muffles and holders are employed in the heat treatment and processing of semiconductors.

A number of techniques have been developed for fabricating high silica glass bodies. In perhaps the most widely used of these techniques, naturally occurring quartz crystals are initially hand sorted, and then heated to the alpha-beta quartz transition temperature (approximately 573 degrees Centigrade (C) to fracture the sorted crystals. The fractured quartz is again hand sorted and then crushed, typically in a ball milling machine. After being cleaned, e.g., acid washed, the crushed quartz is then introduced into an oxy-hydrogen flame to fuse the quartz powder into a high silica glass body.

While the above-described technique is useful, it does have a number of disadvantages. For example, this technique is relatively expensive because of the need to select (i.e., sort) the raw material (the naturally occurring quartz) by hand. In addition, the raw material typically contains impurities, such as iron ions and other transition metal ions, as well as hydroxyl groups, which absorb electromagnetic radiation of wavelengths equal, or close, to those employed in commercial optical fiber communication systems, e.g., 1.3 micrometers ($\mu$m), and thus produce relatively high optical loss. Moreover, the raw material often contains other impurities, such as zirconia, which cause scattering and/or produce crystalline phases, e.g., zircon, which degrade the mechanical strength of glass fibers. Additional such scattering impurities are also introduced during the ball milling process, while additional hydroxyl ions are introduced by the oxy-hydrogen flame. Further, this particular glass fabrication technique generally precludes the incorporation of dopants into the resulting glass body. As a consequence, this technique is generally viewed as being undesirable for the fabrication of certain high silica glass bodies, including optical fiber preforms.

Techniques have been developed which avoid at least some of the disadvantages, discussed above, and which thus permit the fabrication of high silica glass bodies such as optical fiber preforms. Two such related techniques are known as the outside vapor deposition (OVD) technique and the vapor-phase axial deposition (VAD) technique. In both techniques, reactive gases, such as $SiCl_4$ and $O_2$, are flowed into an oxy-hydrogen flame where they react to form particles of silica, called soot particles, which are thermophoretically deposited onto a glass substrate. If, for example, it is desired to increase the refractive index of the resulting glass body by incorporating up dopants such as $GeO_2$ or $P_2O_5$, then the reactive gases will typically also include $GeCl_4$ or $POCl_3$ (which react with the $O_2$ to form the up dopants). In any event, the resulting, relatively porous soot mass is then heated to the sintering temperature (typically about 1400 to about 1500 degrees C,) to form a relatively dense, high silica glass body.

As discussed, both the OVD and the VAD techniques permit the incorporation of dopants into glass bodies, and are thus useful in the fabrication of, for example, optical fiber preforms. However, the rate of deposition of soot particles in these techniques is relatively low because the deposition rate is limited both by thermophoresis and by the relatively low concentration of silica particles in the gas streams heated by the oxy-hydrogen torch. As a consequence, the resulting glass bodies are relatively expensive.

Another technique, useful in the fabrication of optical fiber preforms, is known as the chemical vapor deposition (CVD) technique. Here, reactive gases, such as those discussed above, are flowed into a silica substrate tube, and allowed to diffuse to the inner surface of the tube where they react to form relatively dense silica glass. Unfortunately, the rate of glass formation is relatively low. Further, attempts to increase the rate of glass formation by increasing the concentrations of the reactive gases have failed because such relatively high concentrations lead to gas phase nucleation of silica particles, which are often swept out of the substrate tube by the gas stream, rather than being deposited onto the inner surface of the substrate tube. Moreover, attempts to increase the rate of glass formation by increasing the flow rate of the reactive gases have been thwarted because at these relatively high flow rates there is insufficient time for the reactive gases to diffuse to the inner surface of the substrate wall (to react and form silica) before being swept out of the substrate tube. Consequently, this technique is also relatively expensive.

Yet another technique useful in the fabrication of high silica glass bodies, such as high silica glass optical fiber preforms, is known as the modified chemical vapor deposition (MCVD) technique. This technique differs from the CVD technique in that silica particles are intentionally nucleated in the gas phase, and thermophoretically deposited onto the inner surface of the substrate tube. This technique is advantageous because it yields high purity glass, and permits the ready incorporation of dopants. However, and although the rate of glass formation is significantly higher than that associated with the CVD technique, and the resulting glass bodies are thus less expensive than those produced via the CVD technique, still higher rates of glass formation, and still less expensive glass bodies, are being sought.

A relatively new glass-forming technique, known as the sol-gel method, offers the possibility of fabricating relatively inexpensive high silica glass bodies. In one variant of this technique, known as the alkoxide gel method, a silicon-containing alkoxide, such as tetraethyl orthosilicate (TEOS), is mixed with a water-containing solution. Because TEOS is normally not miscible with water, mixing is achieved by, for example, dissolving the TEOS in a water-soluble solvent such as ethanol, and then adding the resulting TEOS-ethanol solution to the water-containing solution. This mixing process results in the formation of a sol, which is then poured into a mold to undergo a gelation process. (A sol, for purposes of this disclosure, denotes a combination of liquids, dissolved solids and/or fine particles dispersed in a liquid.) Depending upon a number of variables, the gelation process yields either a silica-containing, porous gel body (with the pores containing liquids such as water and ethanol), or a silica-containing powder which precipitates out of solution. (A gel body, for purposes of this disclosure, is a multiphasic body, i.e., a body which includes at least a liquid and a solid phase, formed from a sol via the interconnection of solid material.) If, for example, the gelation process yields a gel body, then this body is typically dried (to remove the liquids remaining within the pores of the body) and then sintered to form a densified, silica-containing glass body. (Regarding the alkoxide gel method see, e.g., S. Sakka, *Treatise on Materials Science and Technology*, Vol. 22, Glass, III (Academic Press, New York, 1982).)

Significantly, the starting materials employed in the alkoxide-gel method are typically of relatively high purity, and thus the resulting glass bodies are of equally high purity (the presence of impurities being undesirable because they lead to scattering and/or optical absorption). In addition, index-changing dopants are incorporated into the glass bodies either during the formation of the sol, during the gelation process, or after the gel body has been dried and is still porous. Further, after the drying procedure, water (and thus hydroxyl ions) remaining within the pores of the dried gel bodies are readily removed by contacting the bodies with (gaseous) chlorine. Consequently, the alkoxide-gel method offers many advantages when compared with the other glass-forming techniques. However, large shrinkages occur during drying, and therefore the drying process must generally be carried out at a relatively slow rate to avoid cracking the gel bodies. Moreover, relatively large glass bodies (glass bodies having a mass of a few hundred grams) are not readily achieved.

In a second variant of the sol-gel method, known as the colloidal gel method, commercially available fumed silica, or silica powder formed via the alkoxide-gel method, is mixed with water, and the mixture is cast, gelled, and then dried and sintered. (Regarding the colloidal gel method see, e.g., E. M. Rabinovich et al, Journal of the American Ceramic Society, Vol. 66, p. 683, 1983 and D. W. Johnson, Jr. et al, ibid, p688.) In addition to having many of the advantages of the alkoxide-gel method, the second variant also permits the ready fabrication of relatively large glass bodies, i.e., glass bodies having a mass of a few hundred grams. However, very large glass bodies, i.e., bodies having a mass equal to or greater than about 1 kilogram, are not easily achieved.

High silica glass bodies have also been formed by using a plasma torch to fuse gel-derived silica powders (in this regard see U.S. Pat. No. 3,954,431 to Fleming, Jr. et al). That is, the sol-gel method was used to form a gel body which was dried, and then crushed, to form a silica powder. To eliminate silica particles which were either undesirably large or undesirably small, the silica powder was passed through both a 20 mesh screen as well as a 100 mesh screen. The screened powder was then flowed, via a carrier gas, to a bait placed in the path of the plasma flame, where the powder was melted and fused.

While the above-described plasma torch technique is advantageous, this technique involves the crushing of a dried gel body, which permits relatively little control over the sizes of the resulting powder particles. This lack of control is significant because each plasma torch configuration (and, in fact, each configuration of any type of heat source) permits the melting and fusion of silica particles having only a specific, corresponding size range, i.e., particles outside this specific range are either not incorporated into the glass body being formed or, if incorporated, yield undesirable seeds or bubble defects in the body. As a consequence of this relative lack of particles size control, the above-described plasma torch technique is relatively inefficient in the use of the powder feed stock, i.e., the undesirably large or undesirably small powder particles must necessarily be discarded, and thus much of the powder is wasted.

Thus, those engaged in the development of glass fabrication techniques have sought techniques for forming glass bodies which permit improved sizing control over, and thus relatively efficient use of, the feed-stock, are relatively inexpensive, avoid the incorporation of impurities which cause absorption and scattering, permit the incorporation of index-changing dopants into the glass bodies, and permit the ready fabrication of very large glass bodies, i.e., bodies having masses equal to or greater than about 1 kilogram.

SUMMARY OF THE INVENTION

The invention involves a new technique for forming high-silica glass bodies which achieves significantly improved sizing control over, and thus relatively efficient use of, the feed-stock, is relatively inexpensive, avoids the incorporation of unwanted impurities into the glass bodies while permitting the incorporation of index-changing dopants into the glass bodies, and permits the ready fabrication of very large glass bodies. In accordance with this new technique, the sol-gel method, with all of its inherent advantages, is used to form silica-containing gel particles which are fused into a glass body. However, and contrary to previous such techniques, the gel particles are formed, and their sizes controlled, by mechanically, and substantially uniformly, subdividing either a sol which is capable of yielding a substantially cohesive gel body, prior to or during gelation, or a substantially cohesive gel body, preferably while the gel body is still substantially wet, to produce discrete, wet, gel particles, essentially all of which have a desired, substantially uniform size. As a consequence, undesirably large or undesirably small gel particles are not formed, and thus, after drying the gel particles are readily fused into a glass body while wasting relatively little, or nothing, of the feed stock.

Significantly, it has been found that mechanical subdivision of a substantially cohesive gel body is effective in producing discrete, wet, substantially uniformly sized gel particles only if the gel body is also substantially elastic. That is, attempts to mechanically subdivide nonelastic gel bodies have resulted in these bodies undergoing plastic flow to yield non-particulate, pasty masses. Moreover, it has been found that not all the variants of the sol-gel method are capable of yielding substantially elastic gel bodies. For example, the conventional alkoxide method is useful in producing such bodies, while in many cases the conventional colloidal method is not.

BRIEF DESCRIPTION OF THE DRAWINGS

The invention is described with reference to the accompanying FIGURE which depicts, in cross-section, a plasma torch useful in the practice of the invention.

DETAILED DESCRIPTION

The invention encompasses a method for fabricating articles which include high-silica glass bodies, as well as the resulting articles. Included among the articles encompassed by the invention are, for example, optical fibers, glass lenses, glass prisms, glass refractory tubing, muffles and holders.

As discussed, the inventive fabrication method involves a new technique for forming a high silica glass body. In accordance with this technique, the glass body is formed by fusing silica-containing gel particles produced via the sol-gel method. Significantly, essentially all (i.e., at least 90 percent) of the initial sol, or essentially all (at least 90 percent) of the initial gel material, produced by the sol-gel method is readily transformed, via the inventive technique, into discrete, wet, gel particles, essentially all of which have a desired (chosen), substantially uniform size. (For purposes of the invention, the gel particles are wet provided their liquid content is equal to or greater than about 10 percent by weight. In addition, the sizes of these, or any, gel particles are conveniently described in terms of a distribution function characterized by a mean particle size and a standard deviation, $\sigma$. In this regard, the uniformity of the gel particle sizes is readily inferrable from, for example, the ratio of the relatively large particle size at $+1\ \sigma$ from the mean size to the relatively small particle size at $-1\ \sigma$ from the mean size. That is, a relatively large ratio, e.g., 16 or larger, indicates that the gel particles are relatively nonuniform in size, while a relatively small ratio indicates that the gel particles are relatively uniform in size. For purposes of the invention, essentially all of the gel particles are of substantially uniform size provided this ratio is less than or equal to about 15, and preferably less than or equal to about 10, and more preferably less than or equal to about 4.) As a consequence, little or nothing of the initial sol or gel material is discarded prior to or during the fusion step.

In accordance with the invention, gel particles having a desired, substantially uniform size are formed by mechanically and substantially uniformly subdividing either a sol, capable of undergoing gelation to yield a substantially cohesive gel body, prior to or during gelation, or a substantially cohesive gel body (having the additional mechanical properties described below). (For purposes of the invention, mechanical subdivision of a sol or a gel body means that the subdivision is achieved by a process which includes the application of an external force to the sol or gel body. In addition, for purposes of the invention, a substantially cohesive gel body is one which, when heated in room atmosphere to 500 degrees Centigrade for 1 hour, does not disintegrate into particles having dimensions smaller than about 10 $\mu$m. Such a substantially cohesive gel body is, in general, readily produced using the conventional colloidal and alkoxide methods, discussed above, as well as the vapogel method, discussed below. However, a colloidal sol formed by dispersing silica particles having a relatively low specific surface area, e.g., a specific surface area less than about 5 square meters per gram, into a solution containing, for example, more than about 50 percent by weight of polymeric binder, will not yield a substantially cohesive gel body.)

If, for example, an ungelled or partially gelled sol (capable of yielding a substantially cohesive gel body) is to be mechanically subdivided, then this is readily accomplished by, for example, flowing the sol onto the surface of a rotating disc, to fling substantially uniformly sized droplets of ungelled or partially gelled sol into the air, and allowing the droplets to have flights of sufficiently long duration to achieve complete gelation. (While not essential, the sol is heated, or a gelation agent, such as formamide or hydrofluoric acid, is preferably added to the sol to speed gelation during the flight of the sol droplets.) The sizes of these droplets are determined by the rotational speed of the disc and the viscosity of the sol. That is, for a fixed viscosity, an increase in rotational speed produces a decrease in droplet size. On the other hand, for a fixed rotational speed, an increase in viscosity produces an increase in droplet size.

An alternative procedure for mechanically subdividing a sol is to flow the sol through an orifice or a nozzle positioned at the top of a chamber, e.g., a cylindrical chamber, to produce substantially uniformly sized sol droplets which fall toward the bottom of the chamber under the influence of gravity. During their fall, the substantially uniformly sized droplets undergo gelation to yield wet, substantially uniformly sized gel particles, which are collected at the bottom of the chamber. The sizes of the sol droplets, and thus the ultimate sizes of the gel particles, are determined by the size of the orifice and the flow rate of the liquid sol. For example, for a fixed orifice size, an increase in flow rate produces a decrease in droplet size, while for a fixed flow rate, an increase in orifice size produces an increase in droplet size. (While not essential to this procedure, any of a variety of conventional techniques may be used to speed gelation. For example, the chamber may be heated, a gelation agent may be added to the sol, or a gas may be tangentially injected into the chamber to impart a spiral motion to the sol droplets, all of which enhance gelation.)

When mechanically subdividing a substantially cohesive gel body, the subdivision is achieved by, for example, forcing the gel body through a screen having a substantially uniformly spaced, rectilinear grid of material strands, e.g., metallic or polymeric wires. For purposes of the invention, the useful, substantially cohesive gel bodies are those which break via brittle fracture and, preferably, are mechanically weak, i.e., have a breaking stress ranging from about $1 \times 10^4$ Newtons per square meter (N/m$^2$) to about $5 \times 10^6$ N/m$^2$. Gel bodies having a breaking stress less than about $1 \times 10^4$ N/m$^2$ are undesirable because they generally lack the integrity to undergo the mechanical subdivision process, while gel bodies having a breaking stress greater than about $5 \times 10^6$ N/m$^2$, while not precluded, are less desirable because they require a relatively great amount of force to achieve mechanical subdivision. In this regard, it has been found that the desired mechanical weakness is generally achieved immediately after gelation, provided the gel body has a liquid content ranging from about 98 percent by weight to about 40 percent by weight. Liquid contents greater than about 98 percent are undesirable because they lead to breaking stresses less than about $1 \times 10^4 N/m^2$, while liquid contents less than about 40 percent are less desirable because they are difficult to process and lead to breaking stresses greater than about $5 \times 10^6 N/m^2$.

Significantly, it has been found that only substantially elastic gel bodies are useful in the invention, i.e., are capable of being mechanically subdivided to yield discrete, wet, substantially uniformly sized gel particles. (For purposes of the invention, a body is substantially elastic if it fails via brittle fracture and if the application, and subsequent removal, of a stress equal to ninety percent of the breaking stress of the body results in a corresponding, permanent strain, i.e., a strain which persists for at least 2 hours, of no more than about 10 percent.) That is, attempts to force nonelastic gel bodies, e.g., plastic gel bodies, through a screen have resulted in these bodies flowing through the screen to form non-particulate, pasty masses.

It has further been found that not all variants of the sol-gel method are useful in producing substantially elastic gel bodies. For example, the conventional alkoxide variant yields such bodies, while in many instances the conventional colloidal variant does not. However, if a gel body formed via the conventional colloidal variant is dried to the point that the body's liquid content is less than about 10 percent by weight, and wetted with water so that the body's liquid content ranges from about 20 percent by weight to about 80 percent by weight, then the resulting body will be substantially elastic. Moreover, it has been found that a new variant of the sol-gel method, called the vapogel method, is also useful in producing substantially elastic gel bodies. In general, this new variant involves bubbling $SiCl_4$, in the vapor phase, into a water bath. Further details about this new variant are to be found in a concurrently filed patent application, designated Fleming-Pardenek Case 16-1, in which the inventors are J. W. Fleming and S. A. Pardenek, and which is hereby incorporated by reference.

As noted, sols (which are to undergo mechanical subdivision), to be useful in the invention, need only be capable of yielding substantially cohesive gel bodies, i.e., either substantially cohesive, substantially elastic gel bodies or substantially cohesive, non-elastic gel bodies. However, it has been found that the gel particles produced by mechanically subdividing sols which are capable of yielding non-elastic gel bodies are, in some instances, not entirely as desirable as the gel particles produced by mechanically subdividing either sols which are capable of yielding substantially elastic gel bodies or gel bodies which are substantially elastic. That is, the latter gel particles (here termed substantially elastic gel particles), provided they are equal to or smaller than about 1 centimeter in size, suffer little or no disintegration (crumbling) during the processing, i.e., the drying and sintering steps, described below. Thus, although the substantially elastic gel particles undergo shrinkage and consolidation during this processing, this shrinkage and consolidation is substantially uniform and therefore the substantially elastic gel particles remain substantially uniformly sized (as defined above). On the other hand, the gel particles derived from sols which yield non-elastic gel bodies (here termed non-elastic gel particles), at times, suffer some disintegration during processing. As a consequence, the processed, non-elastic gel particles sometimes exhibit less particle size uniformity than the processed, elastic gel particles.

Immediately after their formation, the substantially uniformly sized gel particles (formed as described above) are wet, and should be dried prior to undergoing fusion. For purposes of the invention, a gel particle is dry provided its liquid content is less than about 10 percent by weight. Useful drying procedures involve, for example, heating the wet gel particles in, for example, a drying oven, at a temperature ranging from about 50 degrees Centigrade (C) to about 250 degrees C. and for corresponding times ranging from about 1 hour to about 100 hours. Temperatures less than about 50 degrees C. and heating times less than about 1 hour are undesirable because they are ineffective in drying relatively large batches of gel particles. Temperature greater than about 250 degrees C. and heating times greater than about 100 hours are undesirable because the drying equipment and processing times are uneconomical. Alternatively, the gel particles are dried by being exposed to room-temperature air, for relatively long periods of time, e.g., more than 100 hours.

During drying, the originally wet gel particles shrink as a result of liquid evaporation. Depending upon the drying procedure employed, this shrinkage (substantially uniformly) reduces the dimensions of the gel particles by percentages ranging from 0 to about 80 percent. Thus, for example, millimeter-sized, wet gel particles shrink to dried gel particles having (mean) sizes which range from about 0.2 millimeters (mm) to 1 mm.

If the dried gel particles are to be incorporated into a glass body of optical quality, then these particles are preferably contacted with a gaseous halogen, such as gaseous $Cl_2$, or a gas which includes a gaseous halogen, subsequent to drying, to remove unwanted impurities such as water and/or hydroxyl ions. That is, it is believed the halogen serves to diffuse into the interior of each gel particles, react with the unwanted impurities to form volatile (gaseous) halogenides, e.g., HCl, which then diffuse out of the gel particle. It is also believed that this diffusion process includes both gaseous diffusion through the pores, and solid state diffusion through the solid portions of the gel particles. In this regard, the volume of pores in each gel particle preferably ranges from about 10 percent to about 90 percent, and more preferably ranges from about 30 percent to about 80 percent. Volumes less than about 10 percent are undesirable because this implies that an undesirably large number of pores are closed off, which reduces the diffusion rate of the halogen and of the halogenides (into and out of the gel particle) to an undesirably low level. On the other hand, volumes greater than about 90 percent are undesirable because the resulting gel particles exhibit an undesirably high degree of fragility. Concomitantly, the pore sizes preferably range from about 2 nanometers (nm) to about 10 $\mu$m, and more preferably range from about 5 nm to about 1 $\mu$m. Pore sizes less than about 2 nm are undesirable because this also reduces the gaseous diffusion rate of the halogen and halogenides in the pores to an undesirably low level. Pore sizes greater than about 10 $\mu$m are undesirable because they imply, for example, pore volumes greater than about 90 percent, which are undesirable for the reason given above, and because they make consolidation during sintering undesirably difficult. Alternatively, such large pore sizes often imply relatively thick, solid structures surrounding the pores, and corresponding, undesirably long solid state diffusion lengths in the gel particle. Moreover, the specific surface area of such gel particles, which necessarily includes the surface areas of the pores, preferably ranges from about 10 square meters per gram ($m^2/gm$) to about 1000 $m^2/gm$, and more preferably ranges from about 20 $m^2/gm$ to about 600 $m^2/gm$. Specific surface areas less than about 10 $m^2/gm$ are undesirable because they also lead to undesirably long solid state diffusion lengths. Specific surface areas greater than about 1000 $m^2/gm$ are undesirable because this results in undesirably slow gaseous diffusion through the pores.

Generally, the sol-gel variants useful in the invention yield gel bodies, and gel particles, which, after undergoing the above-described drying procedure, have the above-described ranges of volumetric porosity, pore sizes, and surface areas.

While not essential to the invention, the gel particles are preferably sintered after being dried, to produce particles of glass. Sintering is achieved, for example, by first heating the particles to temperatures ranging from about 500 degrees C. to about 1500 degrees C. (depending upon factors such as composition and specific surface area), and then maintaining the particles at these temperatures for corresponding times ranging from 0 hours to about 10 hours. Sintering temperatures less than about 500 degrees C. are undesirable because the resulting particles exhibit undesirably low densification. Sintering temperatures and times greater than about 1500 degrees C. and 10 hours are undesirable because they lead to a relatively high likelihood of undesirable crystallization, because the gel particles often fuse together (which is undesirable if they are to be flowed into the path of a fusion flame to form a glass body), and because the needed equipment and processing times are uneconomical. Depending upon the particular sintering procedure, the dried gel particles (substantially uniformly) shrink in linear size (to become glass particles) by percentages typically ranging from about 10 percent to about 90 percent. Thus, millimeter-sized, dried gel particles are reduced to glass particles having (mean) sizes which typically range from about 0.1 mm to about 0.9 mm.

After having been dried (and, if desired, sintered), the gel particles are fused to form a glass body. Fusion is achieved by heating the gel particles to temperatures above their softening point, i.e., to a temperature where the viscosity is less than about $10^{7.6}$ poise. Any of a variety of heat sources are useful for this purpose including, for example, an oxy-hydrogen torch. Preferably, however, the heat source is a plasma torch of the type described in U.S. Pat. No. 3,954,431, discussed above, which is hereby incorporated by reference. Such a plasma torch 10 is depicted in the accompanying Figure and includes, for example, a cylindrical, fused silica mantle 20 which is closed at one end (the top end, as viewed in the Figure). This mantle 20 is connected by a tube 30 to a source of gas 40. The torch 10 also includes a coil 50 encircling the open end (the bottom end, as viewed in the Figure) of the mantle 20, which coil is electrically connected to a high-powered (10–100 kilowatts) r-f generator 60.

In the operation of the plasma torch 10, a gas, e.g., oxygen, is flowed into the silica mantle 20 via the tube 30, and r-f power supplied to the coil 50, to achieve a plasma discharge which yields an incandescent flame 70.

When the plasma torch 10 is used for fusion, the flame 70 serves to produce a flow of hot gases toward, and around, a bait 100 supported by a pedestal 110, placed in the path of the hot gases. In addition, a carrier gas, such as nitrogen, emanating from a feed tube 80, is initially used to flow the gel particles through the hot gases, toward the bait. During the flight of the gel particles, heat transfer from the hot gases to the gel particles serves to melt the gel particles which, upon impacting the bait, initiate the formation of a glass boule 90. Subsequent gel particles are then directed through the hot gases toward the molten portion 95 of the boule 90. In this regard, the pedestal 110 is preferably lowered at a rate sufficient to keep the position of the molten portion 95 constant relative to the flame 70 and feed tube 80.

Not all sizes of gel particles are melted and fused by the plasma torch 10. That is, relatively small gel particles are entrained by the hot gases produced by the flame 70 and, as a consequence, are flowed around the forming boule 90 rather than impacting, and being incorporated into, the boule. By contrast, relatively large gel particles have sufficient momentum to penetrate the hot gases (without being entrained), to impinge the boule 90. However, if the gel particles are too large, then the heat transfer from the hot gases during the flight time of the gel particles to the boule 90 will be insufficient to completely soften these gel particles. As a consequence, these partially softened gel particles, upon impacting the boule, will form undesirable seeds or bubble defects in the boule.

The appropriate sizes of the gel particles that are fused by a particular plasma torch configuration depends upon a number of plasma, fluid flow and heat transfer parameters and must generally be determined empirically. One useful empirical procedure is to successively flow gel particles of different, but known, sizes into the path of the flame 70. Those particles which are relatively small will be entrained by the hot gases, and thus will not form a glass boule. Those particles which are too large to be completely softened will form seeds or bubble defects.

In one embodiment of the plasma torch 10, the fused silica mantle 20 has an inside diameter of 5 centimeters (cm). A plasma is created within the mantle 20 by successively flowing two different gases into the mantle via the tube 30, and applying an AC signal of, for example, 3 megahertz and 18 kilowatts, to the coil 50. The gas in which the plasma discharge is initially struck is argon, which is flowed into the mantle 20 via the tube 30 at a flow rate of, for example, 12 liters per minute. This plasma is then maintained in oxygen, which is flowed into the mantle 20 via the tube 30 at a flow rate of, for example, 20 liters per minute. The resulting pressure of the gas within the mantle 20 is atmospheric pressure, or slightly higher.

The bait 100 is positioned along the axis of the cylindrical mantle 20, at a distance of 5 cm below the open end of the mantle. The feed tube 80 is inclined at an angle of about 75 degrees from the axis of the mantle 20, with the open end of the tube being positioned a distance of about 3 cm from the axis and a distance of 0.1 cm below the open end of the mantle 20.

If the carrier gas used to deliver the gel particles is nitrogen, and the flow rate is 1 liter per minute, then under the above circumstances it has been found that the sizes of the dried (or sintered) gel particles preferably range from about 0.1 mm to about 1 mm (as determined using the above empirical procedure). That is, dried (or sintered) gel particles having sizes outside this range are undesirable because an undesirably large number of such gel particles are either not incorporated into the glass boule, or form seeds or bubble defects in the boule. In this connection, the inventive technique for producing substantially uniformly sized, wet gel particles is well suited to producing gel particles which, after drying, or drying and sintering, fall within the above size range.

After the formation of the silica boule, as described above, the desired article is completed by a series of conventional steps. For example, if an optical fiber is to be formed, then the inventive technique, or some other technique, is initially used to form a silica-containing rod, and then the inventive technique is used to form a silica-containing jacket contacting, and encircling, the rod. (In this regard, the rod would be oriented transversely to the flame 70, and would be rotated, and moved horizontally, while forming the jacket.) The rod and jacket are then drawn into an optical fiber using well known techniques.

EXAMPLE 1

A sol was prepared by mixing 3 batches of material in a 4 liter blender, each batch containing 400 grams of fumed silica and 1600 grams of distilled water. The fumed silica, which is sold under the trade name CabO-Sil, was purchases from the Cabot Corporation of Tuscola, Ill. The specific surface area of the fumed silica was 200 $cm^2/gm$. The resulting sol was allowed to stand, in room atmosphere, at room temperature, for one hour, while gelation occurred.

The gel body produced via the above (colloidal gel) procedure was then pushed, by hand, through an 18 mesh screen, in an attempt to mechanically subdivide the gel body, and thus form gel particles. This attempt failed because the subdivision process resulted in the body flowing through the screen to form what appeared to be a sol, which then gelled to form a gel body.

EXAMPLE 2

A gel body formed by mixing fumed silica and distilled water, as in Example 1, was dried in an oven at 150 degrees C. for 24 hours. During this drying procedure, the gel body broke into centimeter-sized gel pieces, each of which contained less than 5 percent by weight of water. The volume porosity of the dried gel pieces was found to be approximately 75 percent, using conventional mercury porosimetry.

The dried gel pieces were placed in a bath of distilled water for about 5 minutes, the excess water was decanted, and the rewetted gel pieces were removed from the bath. Each of these pieces was then pushed, by hand, through an 18 mesh screen to form substantially uniform, millimeter-sized gel particles. These gel particles were then dried in a conventional, glass vacuum drier, at 150 degrees C., for four hours.

The dried gel particles were placed in a furnace, and the furnace temperature was increased at a rate of 200 degrees C. per hour until the sintering temperature of 1400 degrees C. was reached. The gel particles were then continuously heated at 1400 C. for two hours. The furnace was then cooled to room temperature (about 23 degrees C.), and the sintered gel particles were removed.

The sintered gel particles were placed in a vibratory powder feeder and flowed via a nitrogen carrier gas into the path of the flame of the plasma torch embodiment, described above. The gas used in the plasma torch was initially argon, which was flowed into the silica mantle at a flow rate of 12 liters per minute, and then oxygen, which was flowed into the silica mantle at a flow rate of 20 liters per minute, while a 3 megahertz, 18 kilowatt signal was applied to the coil encircling the mantle. The flow rate of the nitrogen carrier gas was 1 liter per minute, which produced a flow of gel particles of approximately 10 grams per minute. The flow of gel particles was continued for 100 minutes until a 1 kilogram-sized glass body had formed on the bait.

EXAMPLE 3

A sol was formed by initially mixing 4.46 liters of TEOS with 4.46 liters of ethanol, which TEOS-ethanol solution was then mixed with 1.44 liters of slightly acidic water, to produce a solution having a pH of 3. The resulting sol was then heated to 80 degrees C. for approximately 5 minutes to achieve complete gelation.

The gel body produced via the above (alkoxide gel) procedure was pushed, by hand, through an 18 mesh screen to form substantially uniform, millimeter-sized gel particles. These gel particles were dried in a microwave oven, using a power of 1800 watts, for 30 minutes. The dried gel particles were then placed in an oven into which helium was flowed at a flow rate of 1 liter per minute, while the temperature of the oven was raised from room temperature to 800 degrees C. over a period of 2 hours. While maintaining a temperature of 800 degrees C., chlorine gas was also flowed into the oven at 100 cubic centimeters per minute, for a period of one hour. After this one hour period of time, the chlorine flow (but not the helium flow) was stopped, and the oven temperature was increased to 1400 degrees C over a period of one hour. This temperature and atmosphere was maintained for one hour to achieve sintering. The oven was then cooled to room temperature, and the sintered gel particles removed.

The sintered gel particles were then flowed via a nitrogen carrier gas, as described above, into the path of the flame of the plasma torch, to form a 1 kilogram-sized glass body.

EXAMPLE 4

A 30 liter glass flask was filled with 25 liters of distilled water, into which vaporous silicon tetrachloride was flowed (at a flow rate corresponding to 150 grams of silicon dioxide per minute), while the water was stirred. The flow of silicon tetrachloride was continued for approximately 15 minutes, during which time the resulting sol gelled. The flask containing the gel body was then placed in a vacuum chamber, the pressure was lowered to 5 kilopascals, and the flask was heated to 150 degrees C. for 8 hours to achieve drying.

After the gel body was dried to a volume of 5 liters, the gel body was removed from the flask and pushed, by hand, through an 18 mesh screen to form substantially uniform, millimeter-sized gel particles. These gel particles were then placed in an oven, and the oven temperature was increased to 1350 degrees C., at a rate of 200 degrees C. per hour, to achieve sintering. The resulting, sintered gel particles were then rapidly cooled to room temperature, and removed from the oven.

The sintered gel particles were flowed via a nitrogen carrier gas, as described above, into the path of the flame of the plasma torch, to form a 1 kilogram-sized glass body.

What is claimed is:

1. A method for fabricating an article comprising silica-containing glass, the method comprising the steps of:

forming silica-containing gel particles, said forming step including the step of mechanically subdividing (1) an ungelled or partially gelled sol capable of yielding a substantially cohesive gel body and/or (2) a gel body which is substantially cohesive and substantially elastic, such that essentially all of said gel particles are wet and are of substantially uniform size;

fusing said gel particles into a silica-containing glass body; and completing the fabrication of said article.

2. The method of claim 1 wherein said substantially cohesive and substantially elastic gel body is mechanically weak.

3. The method of claim 1 further comprising the step of drying said wet gel particles produced during said forming step, prior to said fusing step, to produce dried gel particles.

4. The method of claim 3 wherein the volumetric porosity of said dried gel particles ranges from about 10 percent to about 90 percent.

5. The method of claim 3 wherein the sizes of the pores of said dried gel particles ranges from about 2 nm to about 10 $\mu$m.

6. The method of claim 3 wherein in the specific surface areas of said dried gel particles ranges from about 10 $m^2/gm$ to about 1000 $m^2/gm$.

7. The method of claim 3 further comprising the step of contacting said dried gel particles with a halogen-containing gas prior to said fusing step.

8. The method of claim 3 further comprising the step of sintering said dried gel particles prior to said fusing step.

9. The method of claim 1 wherein said article includes an optical fiber.

* * * * *